(12) United States Patent
Cazaux et al.

(10) Patent No.: US 9,454,800 B2
(45) Date of Patent: Sep. 27, 2016

(54) SYSTEM FOR REPRESENTING CARTOGRAPHIC INDICATIONS AT MULTIPLE SCALES

(71) Applicant: THALES, Neuilly sur Seine (FR)

(72) Inventors: Patrick Cazaux, Le Pian Medoc (FR); Laurent Rivaillon, Gujan-Mestras (FR); Herve Leconte, Pessac (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 14/566,650

(22) Filed: Dec. 10, 2014

(65) Prior Publication Data

US 2015/0161766 A1 Jun. 11, 2015

(30) Foreign Application Priority Data

Dec. 11, 2013 (FR) .................................... 13 02894

(51) Int. Cl.
*G01C 23/00* (2006.01)
*G08G 1/0969* (2006.01)
*G06T 3/40* (2006.01)
(Continued)

(52) U.S. Cl.
CPC ................. *G06T 3/40* (2013.01); *G01C 23/00* (2013.01); *G09B 29/106* (2013.01); *G08G 5/0021* (2013.01)

(58) Field of Classification Search
CPC .... G01C 23/00; G01C 21/00; G09B 29/106; G08G 5/0021; G08G 5/025; G08G 5/065; G08G 1/0969; G06T 3/40
USPC .................. 340/995.27, 995.15, 995.1, 971; 345/592, 619; 701/16, 208
See application file for complete search history.

(56) References Cited

U.S. PATENT DOCUMENTS 5,553,209 A * 9/1996 Johnson .................. G06T 17/05
345/667
8,749,405 B2 * 6/2014 Knebel ................ G01C 21/367
340/995.14
(Continued)

FOREIGN PATENT DOCUMENTS

EP 2 533 015 A2 12/2012
EP 2 637 152 A1 9/2013

OTHER PUBLICATIONS

French Search Report for French Counterpart Application No. FR 1302894, 7 pgs. (Oct. 20, 2014).
(Continued)

*Primary Examiner* — Hung T Nguyen
(74) *Attorney, Agent, or Firm* — Blakely, Sokoloff, Taylor & Zafman LLP

(57) ABSTRACT

A system for representing cartographic indications for an aircraft, said system comprising at least a cartographic database, a graphical computer, a display device and means of selecting a scale of the displayed cartographic data by a pilot or user. Each item of cartographic data comprises at least a first symbolic representation associated with a first scale depending on said item of cartographic data. When the selection means select a scale that is larger than or equal to the first scale, the first representation is displayed on the display device and when the selection means select a scale that is strictly smaller than the first scale, the first representation is no longer displayed on the display device. Each item of cartographic data can comprise at least a second symbolic representation associated with a second scale smaller than the first scale, said second scale depending on said item of cartographic data and obeying similar display rules.

8 Claims, 3 Drawing Sheets

(51) Int. Cl.
*G09B 29/10* (2006.01)
*G08G 5/00* (2006.01)

(56) References Cited

U.S. PATENT DOCUMENTS

2010/0250030 A1    9/2010  Nichols
2011/0246003 A1*  10/2011  Lafon .................. G08G 5/0021
                                                         701/16
2015/0120177 A1*   4/2015  Palanisamy .......... G08G 5/0021
                                                        701/120

OTHER PUBLICATIONS

Gabriel Svennerberg, " Google Maps API 3," XP055288778, pp. 201-205 (Dec. 31, 2010) http://maps.unomaha.edu/Peterson/GEOG8670_Spring15/Google_Maps_v3.pdf.

Luke Mahe et al., "Too Many Markers! | Google Maps APIs | Google Developers," XP055288759, 18 pages (Dec. 1, 2010).

European Extended Search Report for counterpart EP Application No. 14194643.4-1557, 7 pages (Jul. 22, 2016).

* cited by examiner

NORMAL WAYPOINT
SYMBOL

SIMPLIFIED
WAYPOINT SYMBOL

NORMAL AIRPORT
SYMBOL

SIMPLIFIED AIRPORT
SYMBOL

SYSTEM FOR REPRESENTING CARTOGRAPHIC INDICATIONS AT MULTIPLE SCALES

BACKGROUND OF THE INVENTION

1. Field of the Invention

The general field of the invention is that of systems for managing aeronautical missions comprising a cartographic display. The more particular field of the invention is that of managing the display and the cartographic representation of various data in the case of a change of scale.

2. Description of the Prior Art

These systems are used on the ground for carrying out mission preparations or on board aircraft on systems installed on board and operating in real time. They therefore allow the preparation, monitoring or modification of the mission.

The purpose of these systems is to provide an overall, clear and consistent view of the situation of the aircraft in its environment. The principal items of information to be displayed are the navigation data:

Airports and heliports;
Navigation beacons of the following types: NDB (Non Directional Beacon), VOR (VHF Omnidirectional Range), DME (Distance Measuring Equipment), VORDME, TACAN (TACtical Air Navigation), VORTAC, ILS (Instrument Landing System);
Aeronautical waypoints or "Waypoints";
Procedures of the air route, or "airways" type: SID (Standard Instrument Departure), STAR (Standard Terminal Arrival Route), APP (Approaches);
Air sectors or "airspaces".

All of the above data are present in databases in standardized formats like the ARINC 424 or "Navigation System Data Base Standard" type. The data relating to point, linear or surface obstacles are also critical for aeronautical systems. These data relating to obstacles are also present in databases.

A system for managing aeronautical missions essentially comprises four main sections shown in FIG. 1 and which are:

A tool for preparing the database denoted "tools";
The database itself or "Database" or "DB";
A computer or "Processing" whose functions are to select the useful data intended to be displayed as a function of the terrain flown over, of the selected scale and a certain number of factors depending on the flight or on the mission;
Finally, one or more display devices displaying the selected data and denoted "Display" in FIG. 1.

The installation of such a system must meet two main objectives. The ergonomics of the interface must ensure the best possible legibility of the selected data and their consistency and display continuity when the scale changes. The system must operate in real time with a limited memory space. It is therefore necessary to optimize the amount of disk space necessary and the workload of the computer. Keeping to these objectives gives rise to a certain number of problems as described in detail below.

There is a very large amount of data to be displayed. At large scales, those corresponding to a country or a region, it cannot be envisaged to display all of the data because too much information is no longer legible.

In order to favour good comprehension of a complex display, it is necessary to provide good continuity of display when the user changes scale or representation. This change can take place continuously or in steps. In all cases, the system must display a legible and consistent display at each intermediate step. The continuity of display must also make it possible to avoid "flashing" effects, that is to say an element or an item of data that disappears at a certain scale and must no longer reappear at a larger scale.

In order to solve these different problems the existing solutions are of two types. It is possible to carry out a filtering of information either at the level of the DB or at the processing level.

Filtering information at the level of the DB is standard at the present time. This solution is applicable in all industrial and consumer presentations. It consists in constructing several databases with different levels of precision of the various items of information. Each DB is constructed to allow optimum rendering at a given scale. Dynamically, the cartographic system uses the optimum database closest to the current scale.

This solution has the following disadvantages:

Absence of display continuity for continuous scale changes. The change from one database to another results in a sudden change in representation which is not compatible with the need for continuity in the display. The change from one database to another generally necessitates a time period or latency. The associated transient processing which corresponds to a complete erasure of the image or to an incomplete image or to a blocking of interaction with the system reinforces the sensation of discontinuity in the display;

Large memory volume necessary. The solution necessitates the construction of several databases, and therefore of duplicating them. The necessary memory volume consequently increases. This is not detrimental to solutions accessing a DB via a "Web" interface. On the other hand, this problem is very detrimental to for a stand-alone on-board database present in an avionic system.

When filtering information at the processing level, the system dynamically calculates the optimum quantity of elements to be displayed at a given scale as a function of filtering rules making it possible to select said elements. The term "decluttering" is also used. The following can be mentioned as examples of dynamic filtering rules:

Do not exceed a maximum number of elements displayed per type of object;
No longer display certain objects above a certain scale;
Establish a hierarchy of priorities of objects as a function of their type;
Establish a hierarchy of priorities of objects as a function of their distance from the aircraft.

This latter solution has three disadvantages as described in detail below:

Complexity of the "decluttering" rules. The "advanced" decluttering rules such as, for example, the detection of graphical overlapping of close objects, necessitate complex calculations carried out dynamically. The dynamic implementation of advanced rules has poor performance on top of the range consumer equipment and is totally incompatible with present day avionic computers.

Complex updating procedures. In order to evolve a representation bound to a rule, it is systematically obligatory to modify the software.

Display continuity could be improved. In order to solve the problems mentioned above, the existing systems implement a compromise which is generally carried out to the detriment of the display continuity.

It should be noted that certain solutions used for consumer applications combine both methods in order to try to reduce the problems encountered, without however totally solving them.

SUMMARY OF THE INVENTION

The purpose of the invention is to associate with each representation of the object a scale dependent on the object and on the basis of which said representation is displayed. This scale is calculated previously. The invention can be used for a single representation per object and a single scale. In this case, when the current scale is strictly smaller than said scale, the object is no longer represented. It is preferable however that each item of data comprises at least two symbolic representations with two different associated scales in order to create levels of representation.

More precisely, the invention relates to a system for representing cartographic indications for an aircraft, said system comprising at least a cartographic database, a graphical computer, a display device and means of selecting the scale of the displayed cartographic data, each item of cartographic data comprising a first symbolic representation, characterized in that with the first symbolic representation there is associated a first scale depending on said item of cartographic data and, when the selection means select a scale that is larger than or equal to the first scale by a pilot or user, the first representation is displayed on the display device, when the selection means select a scale that is strictly smaller than the first scale by the pilot or user, the first representation is no longer displayed on the display device that is controlled by the processor.

Advantageously, each item of cartographic data comprises at least a second symbolic representation associated with a second scale that is smaller than the first scale, said second scale depending on said item of cartographic data such that:

when the selection means select a scale included between the first scale and the second scale, the second representation is displayed on the display device, when the selection means select a scale strictly smaller than the second scale, the symbol is no longer displayed on the display device.

Advantageously, with each item of data there is associated an order of priority, the determination of the first scale and/or of the second scale being carried out as a function of that order of priority.

Advantageously, starting from a determined scale, all of the data corresponding to a same determined order of priority are displayed on the display device with the same first symbolic representation or the same second symbolic representation.

Advantageously, starting from a determined scale, all of the items of data corresponding to a same determined order of priority are no longer displayed on the display device.

Advantageously, a first item of data being placed at a first location, the determination of the first scale and/or of the second scale of said first item of data is carried out as a function of the distance that separates this first location from the closest location of a second item of data.

Advantageously, the data being grouped in categories, the first scale and/or the second scale are identical for all of the items of data of a same category.

Advantageously, the determination of the first scale and/or of the second scale depends on the selection or absence of selection of data of a different category.

BRIEF DESCRIPTION OF THE DRAWINGS

The invention will be better understood and other advantages will become apparent on reading the following description given in a non-limiting manner and with reference to the appended figures in which.

DETAILED DESCRIPTION

In the continuation of this text, the term "scale" denotes the ratio between the measurement of a real object and the measurement of its cartographic representation. It is expressed by a numerical value which is generally in the form of a fraction. The following convention has been adopted. Thus, a scale of 1/100,000 signifies that one centimeter on the map corresponds to one kilometer on the terrain. The expression "large scale" therefore denotes a scale that approaches the scale 1/1. On the contrary, "small scale" denotes a scale of high value which is distant from the scale 1/1 and which corresponds to a representation of reduced size. Consequently, at a scale that is larger than another scale, finer details appear and the displayed cartographic area reduces.

The display system installed on board an aircraft according to the invention comprises a cartographic database, a graphical computer, a display device and means of selection of the scale of the displayed cartographic data.

In modern aircraft, the system generally comprises several display devices disposed in the cockpit and displaying the parameters necessary for the piloting and the navigation and more generally for the accomplishment of the mission. There are different ways of representing the terrain flown over. It can be represented by a two-dimensional or three-dimensional cartographic view. As has been stated, these views necessarily comprise navigation data.

The pilot can select the scale of the terrain flown over as a function of flight phase. The selection can be made either by means of a graphical cursor controlled by a CCD, the acronym for "Cursor Control Device", equivalent to a computer mouse, or directly on the display screen if it is equipped with a touch-sensitive faceplate by means of selection of a function or by making an appropriate gesture.

The selection of the scale gives rise to the selection of the data displayed insofar as it is impossible to display ail of the data contained in the database at all of the scales.

Figure 1:
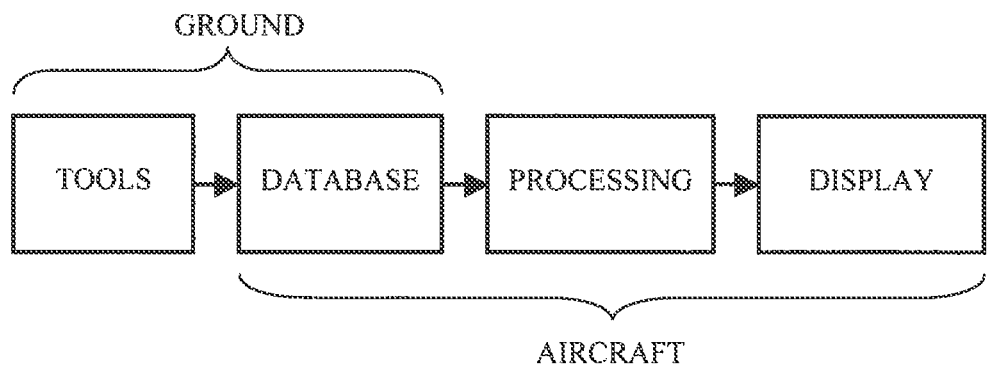
FIG. 1 already commented upon, shows the block diagram of a mission management system.
Figure 2:
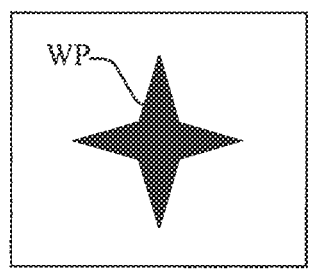
FIG. 2 shows the respective symbolic representations for two different items of information.
Figure 2:
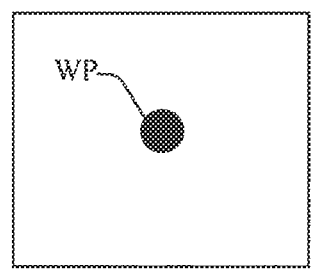
Figure 2:
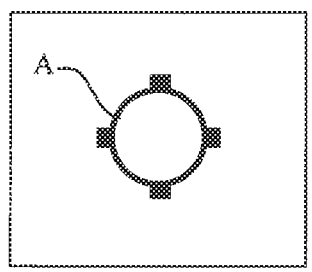
Figure 2:
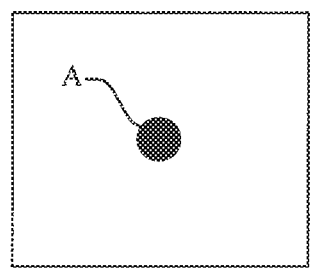

In the system according to the invention, each item of cartographic data comprises at least a first symbolic representation. More generally, each item of cartographic information comprises two different symbolic representations. By way of example, FIG. 2 shows, for two types of data, the first and the second representations that have been denoted normal symbol and simplified symbol respectively. The first item of data represents an aeronautical waypoint or WP, representing "waypoint". Its normal symbolic representation is a black cross with four pointed arms and its simplified symbolic representation is a simple black circle. The second item of data represents an airport A. Its normal symbolic representation is a circle having four square protrusions disposed symmetrically and its simplified symbolic representation is also a simple black circle. Thus, on changing scale, there is a successive change from the first symbolic representation to the second one and then to the absence of representation at small scale.

A first scale is associated with the first symbolic representation and a second scale, smaller than the first scale, is associated with the second symbolic representation. They are arranged such that:

when the selection means select a scale greater than or equal to the first scale by a pilot or user, the first representation is displayed on the display device, when the selection means select a scale included between the first scale and the second scale, the second representation is displayed on the display device, when the selection means select a scale strictly smaller than the second scale by the pilot or user, the symbol is no longer displayed on the display device that is controlled by the processor.

Hereafter the first scale and the second are referred to as "transition scales". It is possible for there to be several transition scales associated with a same item of data.

The advantage of this arrangement can be seen. The choice of the transition scales is carried out on the ground or by the tool for preparation databases. The selection criteria can be complex insofar as the time taken for allocating a scale to a particular item of data is of no importance. Finally, the cartographic database is unique and comprises only one or two additional scale indications, or more if necessary, for each item of data, which does not significantly increase the memory size of the database.

In flight, when the pilot selects a scale called the active scale, for determining the representation which must be selected, the graphical computer compares just the active scale with the scales associated with each item of data in order to select the representation that will be displayed. The selection method is therefore very simple and very quick.

As stated, the selection criteria for determining the transition scales can be complex. They are of course firstly a function of the active scale selected by the pilot. Other criteria can however be involved as described below.

The first criterion is an order of priority. An order of priority is associated with each item of data, the determination of the first scale and/or of the second scale being carried out as a function of this order of priority. It is possible to specify this criterion in such a way that, starting from a determined scale, all of the data corresponding to a same order of priority are displayed on the display device with the same first symbolic representation or the same second symbolic representation. In the same way, it is possible to decide that, starting from a determined scale, all of the data corresponding to a same order of priority are no longer displayed on the display device.

Figure 3:
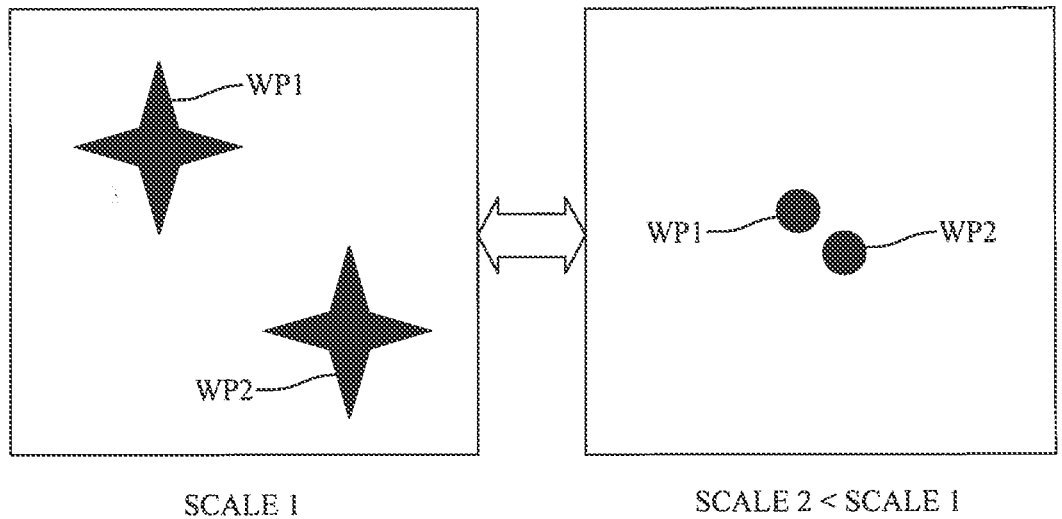
FIG. 3 shows the management of the scales associated with the symbolic representations for two close items of data of identical priority.

The second criterion is a data density criterion. At a given scale, several items of data can be sufficiently close to each other for their symbolic representations to overlap, making it difficult or even impossible to read them. In this case, a first item of data being disposed at a first location, the determination of the first scale and/or of the second scale of said first item of data is carried out as a function of the distance that separates this first location from the closest location of a second item of data. Thus, in FIG. 3, when two first "waypoint" representations WP1 and WP2 indicated by two four-pointed stars at a scale 1 are too close to each other at a scale 2 smaller than the scale 1, they are both replaced at this scale 2 by their simplified representations, in this case a black circle, the two circles being separated and therefore perfectly identifiable. The criterion causing the change from the first symbolic representation to the second one depends on the shape of this representation. A possible change of scale criterion can be that the representation of the two items of data concerned changes when there is more than 20% of common area.

Secondly, if the scale again decreases, the two circles corresponding to the two waypoints are thereafter displayed only by a single point from the time that their representations merge.

Figure 4:
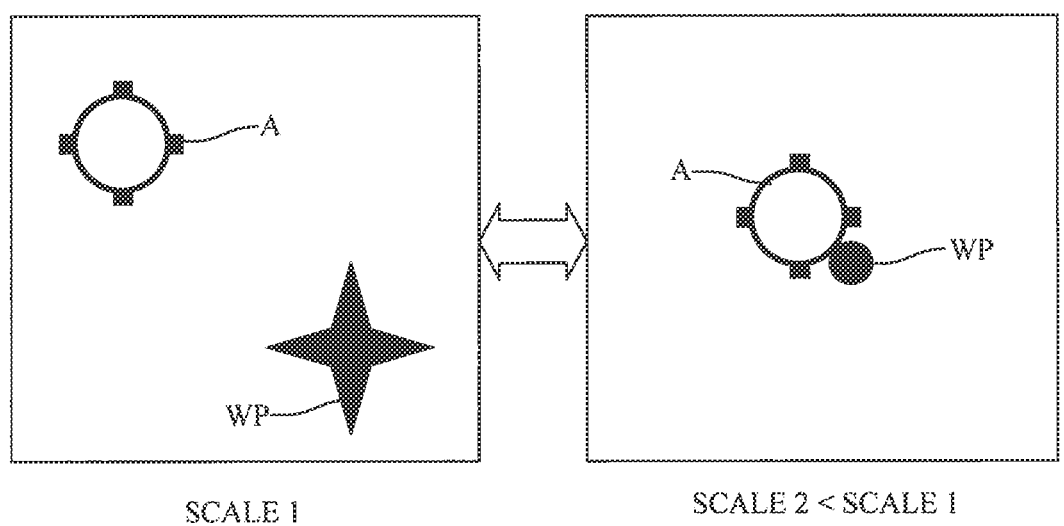
FIGS. 4 and 5 show the management of the scales associated with the symbolic representations for two close items of data of different priority at two different scales.

It is also possible, in the case of close items of data, to take account of their order of priority. Thus, in FIG. 4, two symbols have been represented at a first scale, the first one indicating an airport A and the second one indicating a "waypoint" WP. The display of the airport A has priority over that of the waypoint. Thus, when the two symbols merge at a smaller scale 2, the symbol of the waypoint changes from the first representation to the second one whilst the symbol of the airport, which has priority, does not change.

Figure 5:
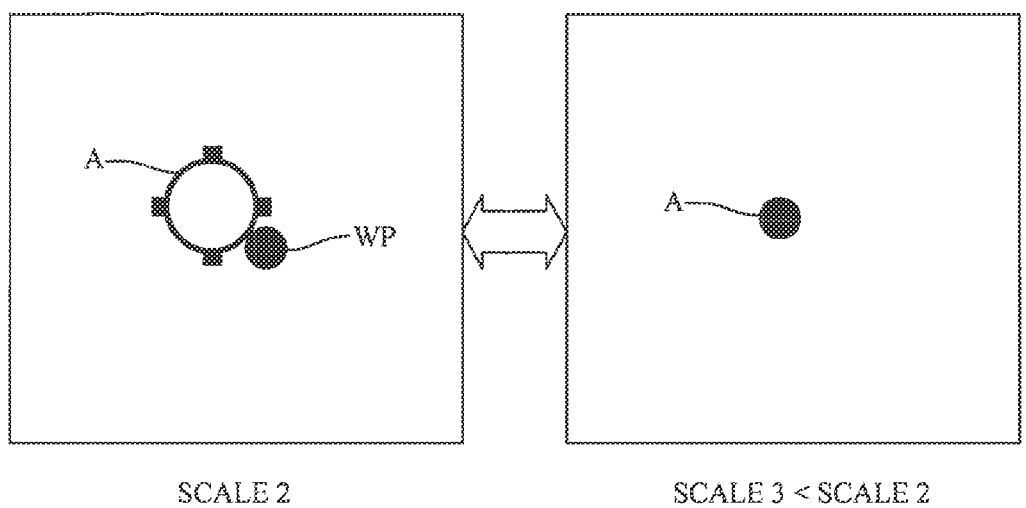

At an even smaller scale 3 shown in FIG. 5, the symbol of the waypoint disappears whilst the symbol of the airport A changes from the first representation to the second representation.

Finally, if the user decides not to display a certain category of data, the determination of the first scale and/or of the second scale for the categories of data still displayed or displayable can depend on the selection or absence of selection of the non-selected items of data category.

The above list of criteria is not of course exhaustive. Other selection criteria can be used for determining the transition scales. They remain within the scope of this invention.

What is claimed is:

1. A system for representing cartographic indications for an aircraft is executed by a processor, the system comprising at least a cartographic database, a graphical computer, a display device and a selecting a scale of a displayed cartographic data by a pilot or user, an each item of the displayed cartographic data comprising a first symbolic representation, wherein the first symbolic representation is associated a first scale depending on the item of the displayed cartographic data, when the pilot or user selects a scale that is larger than or equal to the first scale, the first representation is displayed on the display device, and when the pilot or user selects a scale that is strictly smaller than the first scale, the first representation is no longer displayed on the display device that is controlled by the processor.

2. The system for representing cartographic indications according to claim 1, wherein the each item of the displayed cartographic data comprises at least a second symbolic representation associated with a second scale that is smaller than the first scale, the second scale depending on the item of the displayed cartographic data such that:

when the pilot or user selects a scale included between the first scale and the second scale, the second representation is displayed on the display device, and when the pilot or user selects a scale strictly smaller than the second scale, the symbol is no longer displayed on the display device.

3. The system for representing cartographic indications according to claim 1, wherein the each item of the displayed cartographic data is associated an order of priority, a determination of the first scale and/or of the second scale being carried out as a function of that order of priority.

4. The system for representing cartographic indications according to claim 3, wherein starting from a determined scale, all of the displayed cartographic data corresponding to a same determined order of priority are displayed on the display device with the same first symbolic representation or the same second symbolic representation.

5. The system for representing cartographic indications according to claim 3, wherein starting from a determined scale, all of the items of the displayed cartographic data corresponding to a same determined order of priority are no longer displayed on the display device.

6. The system for representing cartographic indications according to claim 2, wherein a first item of data being placed at a first location, a determination of the first scale and/or of the second scale of the first item of data is carried out as a function of a distance that separates the first location from a closest location of a second item of data.

7. The system for representing cartographic indications according to claim 2, wherein the displayed cartographic data being grouped in categories, the first scale and/or the second scale are identical for all of the items of data of a same category.

8. The system for representing cartographic indications according to claim 7, wherein a determination of the first scale and/or of the second scale depends on the selection or absence of selection of data of a different category.

* * * * *